United States Patent Office 3,065,089

Patented Nov. 20, 1962

3,065,089

MANUFACTURE OF GLASS

Edmond Hustinx, Looiersgracht 4, Maastricht, Netherlands

No Drawing. Filed Dec. 1, 1958, Ser. No. 777,204
Claims priority, application Netherlands Dec. 3, 1957
1 Claim. (Cl. 106—52)

In the conventional manufacturing methods of glass the starting materials, such as sand, soda and lime, are heated to a temperature adapted to allow the same to react and to form a homogeneous molten mass. For this purpose very high temperatures are required. The impurities contained in the starting materials are incorporated into the glass, more particularly the iron which imparts a greenish colour to the glass on the surfaces of fracture and reduces the permeability for ultra violet rays. Especially the sand is a source of impurities which cannot be eliminated by a preliminary purification process of the sand.

The object of the invention is a process of manufacturing glass which presents important advantages with respect to the conventional manufacturing methods. This process consists in heating a mixture of one or more alkali silicates in dry form and one or more silicates of bivalent and if desired trivalent metals to a temperature, sufficient to produce a homogeneous molten mass in which the bivalent and trivalent metals have reacted with and are dissolved in the molten alkali silicate.

Of the alkali silicates sodium silicate is the most important for practical purposes, but potassium silicate may also be used in special cases.

The silicates of bivalent metals which come into consideration are mainly calcium and magnesium silicate. For special types of glass silicates of other bivalent metals, e.g. lead silicate may also be used. In many cases they may be used in combination with a silicate of a trivalent metal, more particularly aluminium silicate.

The alkali silicate in dry form is preferably obtained by dehydrating a waterglass solution, e.g. a sodium silicate solution.

According to an important embodiment of the invention the alkali silicate solution is uniformly mixed with the finely divided silicates of bivalent metals or of bivalent and trivalent metals, the suspension subsequently dehydrated and the dry mass heated to the temperature required for obtaining a homogeneously molten mass. Dehydrating may be effected according to well known methods, e.g. by spray drying or by means of rotating drying drums.

It is advantageous to start from silicates of bivalent or bivalent and trivalent metals which have a high degree of purity and are in a finely divided form. It is therefore preferred to use silicates which have been obtained by precipitating an alkali silicate solution with an aqueous solution of a salt of the metal concerned and thoroughly washing the precipitated silicate. The washed, still moist silicate is subsequently mixed with the alkali silicate solution and the mixture is dried.

Other useful constituents of the glass, such as vanadium compounds, boron compounds, e.g. borax, and the like may be added to the mixture of alkali silicate and bivalent or bivalent and trivalent metal silicates.

The temperature to which the mixture is to be heated in order to obtain a homogeneous molten mass depends on various factors, such as the composition of the mixture and the degree of dispersion of the silicates added to the alkali silicate solution. The temperature, however, is always substantially lower than that which is required in the manufacture of glass of a corresponding composition in accordance with the conventional methods. In general temperatures of 500° C. or lower will be satisfactory.

The use of low temperatures in the melting process has economic advantages, but at the same time the danger of impurities being incorporated into the glass by interaction with the material of the oven is considerably reduced. Moreover the process according to the invention has the advantage that more latitude for the selection of the composition of the glass is provided.

The products, obtained by simply drying the mixture of an alkali silicate solution with silicates of bivalent and if desired trivalent metals may also be used as such for various purposes and the invention therefore also comprises the manufacture of said dried mixtures. Thus e.g. the powders obtained by spray drying have excellent insulating properties and they may therefore be used as insulating materials. It is also possible to produce filaments and fibres from the partly or completely dehydrated liquid mass by similar methods as used in the manufacture of glasswool. In some cases this liquid mass when cooled provides products which have more or less the appearance of precious stones and may be used for ornaments. This is e.g. the case if the starting material is a mixture of an alkali silicate solution and precipitated magnesium silicate.

I may also add certain organic materials to suspensions which are only dehydrated and accordingly are not exposed to temperatures above the decomposition temperatures of the organic materials. Such organic materials are added for modifying the structure of the product obtained. Suitable for this purpose are i.a. silicones, rubber like materials, polyvinylchloride and other synthetic materials. In this way resilient masses of glassy appearance may be obtained.

The invention will be illustrated by the following examples:

*Example 1*

1 mol sodium silicate ($Na_2O3SiO_2$) in the form of a filtered, clear aqueous solution of 35% is mixed with 1 mol calcium silicate in the form of a 5% suspension in water. The calcium silicate has been obtained by adding a 5% solution of sodium disilicate ($Na_2O2SiO_2$) to the equivalent quantity of a 5% calcium chloride solution and thoroughly washing the precipitate produced.

The mixture of sodium silicate solution and calcium silicate suspension is spray dried at a temperature of 150° C. whereby a white powder is obtained. The volume weight of the same may vary from 0.01–1 kg./l., depending on the conditions of the spray drying process. This powder is an efficient insulating material and may also be used as a filler.

When heating the powder well above the melting temperature, e.g. to 700–800° C., in moulds glass articles of high quality and high breaking strength may be obtained. The material may be used e.g. for window glass.

*Example 2*

A glass obtained by the method described in Example 1 from starting materials containing not more than traces of iron, e.g. 0.0001%, may be utilised for producing bulbs for incandescent lamps or for windows presenting a high permeability both for visible and ultraviolet rays.

*Example 3*

½ mol potassium silicate ($K_2O4SiO_2$) in the form of a 30% solution and ½ mol sodium silicate ($Na_2O3.3SiO_2$) in the form of a 35% solution, which have both been carefully filtered, are mixed with a 7% suspension of ½ mol calcium silicate. The calcium silicate has been obtained by adding a 10% solution of sodium meta silicate ($Na_2OSiO_2$) to an equivalent amount of a 5% calcium chloride solution and washing the precipitate to a percentage of chlorine ions of less than 0.01%, calculated on the dry material.

The mixture described above is mixed with a 10% suspension of ½ mol lead silicate. The lead silicate has been obtained by adding a 10% solution of sodium disilicate ($Na_2O2SiO_2$) to a 10% solution of lead nitrate, filtering the precipitate produced and washing the same to a percentage of nitrate ions of less than 0.01%, calculated on dry material.

The suspension containing all ingredients is dried at 120° C. The dried product contains less than 0.001% of iron, due to the careful filtration of the alkali silicate solutions.

The dry product obtained is molten to a glass which is particularly suitable for the manufacture of lenses, prisms and other optical articles having a high permeability for rays in the invisible part of the spectrum. The articles obtained in this way may be ground if desired.

*Example 4*

0.1 mol sodium vanadate in the form of an aqueous solution is added to the suspension produced according to Example 2. The mixture is spray dried to a powder which is molten in a platinum crucible. The molten mass may be pressed or drawn through orifices and simultaneously cooled according to well known methods, e.g. for the manufacture of glass filaments or fibres of high quality.

*Example 5*

1 mol sodium silicate ($Na_2O3.5SiO_2$) in the form of a thoroughly filtered concentrated 30% solution is uniformly mixed with 1 mol calcium silicate in the form of the mineral wollastonite. The mixture is dried and the dried material comminuted to a powder. By heating this powder to above the melting point, e.g. to 900° C., in moulds glass articles, e.g. windows, of high quality are obtained.

*Example 6*

1 mol sodium trisilicate ($Na_2O3SiO_2$) in the form of filtered, clear solution of 10% is sprayed into a 5% solution of 1 mol magnesium sulphate while energetically agitating the liquid. The magnesium silicate formed is washed until it contains less than 0.001% of sulphate ions, calculated on dry material. 0.1 mol pure lithium silicate is then added and the mixture is dried on a drying drum at 120° C. Due to the very low content of strong electrolytes the resulting product is not a powder but a transparent foil with a glassy surface of fracture.

*Example 7*

1 mol of a 10% suspension of magnesium trisilicate, obtained by reacting a filtered sodium trisilicate solution ($Na_2O3SiO_2$) with a magnesium sulphate solution, 1 mol potassium trisilicate ($K_2O3SiO_2$) in the form of a filtered 30% solution and 0.1 mol of a concentrated borax solution is mixed with twice the amount, calculated on dry material, of a commercial 20% emulsion of polyvinyl acetate. The uniform emulsion is dried on a drying drum at a temperature of 120° C., whereby foils are produced.

*Example 8*

2 mol bismuth monosilicate, 1 mol tin monosilicate and 1 mol cadmium disilicate, all obtained by precipitation of the corresponding soluble salts with sodium silicate, are mixed in the form of suspensions with a 25% solution of ½ mol sodium disilicate ($Na_2O2SiO_3$) and ½ mol of a concentrated borax solution. A high molecular silicone fat which is stable to high temperatures, is added to the suspension in a proportion of 1 part by weight on 2 parts by weight of the suspension calculated on dry material. The mass is rubbed to a uniform paste, which is subsequently heated in a nitrogen atmosphere at about 450° C. A glass having pronounced water repelling properties is obtained.

High molecular silicone fats are described by Andres Hunyar in "Chemie der Silikone" (1952), page 217, and by R. Houwink in "Chemie und Technologie der Kunststoffe," vol. II (1956), page 572.

*Example 9*

½ mol potassium disilicate ($K_2O2SiO_2$) and ½ mol sodium disilicate ($Na_2O2SiO_2$), both in the form of a clear 30% solution, are uniformly mixed with ½ mol precipitated calcium disilicate and ¼ mol precipitated magnesium disilicate, both in the form of an 8% suspension. Into the mixture obtained $\frac{1}{20}$ mol micro colloidal silver, obtained by reduction of silver nitrate is incorporated and the mass is heated in a nitrogen atmosphere to about 600° C., whereby readily fusible metallised glass is produced. In contradistinction to the glass products which are metallised at the surface the product obtained according to this example is metallised throughout the whole body of glass.

I claim:

A process for manufacturing glass comprising the steps of (*a*) dehydrating a mixture of (1) an aqueous solution of silicate of alkalimetal selected from the group consisting of sodium and potassium and (2) a precipitated calcium silicate, the molar ratio of calcium silicate to alkalimetal silicate ranging from 1:1 to 1:8, said dehydration being effected at a temperature of 120° to 150° C., and (*b*) heating the resultant dehydrated powder to a temperature of from 600° to 900° C. whereby a homogeneous molten glass is produced.

References Cited in the file of this patent

UNITED STATES PATENTS

| | | |
|---|---|---|
| 38,286 | Cobley et al. | Apr. 28, 1863 |
| 1,234,457 | Glaeser | July 24, 1917 |
| 2,466,849 | Hood | Apr. 12, 1949 |
| 2,511,679 | Thiess | June 13, 1950 |
| 2,934,443 | Shell et al. | Apr. 26, 1960 |

FOREIGN PATENTS

| | | |
|---|---|---|
| 133,981 | Australia | Aug. 25, 1949 |
| 1,073,152 | France | Sept. 20, 1954 |